(12) United States Patent
Johnsson et al.

(10) Patent No.: US 9,379,955 B2
(45) Date of Patent: Jun. 28, 2016

(54) METHOD FOR QUEUING DATA PACKETS AND NODE

(75) Inventors: Andreas Johnsson, Uppsala (SE);
Svante Ekelin, Vallentuna (SE);
Christofer Flinta, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 331 days.

(21) Appl. No.: 13/979,944

(22) PCT Filed: Jan. 28, 2011

(86) PCT No.: PCT/IB2011/000145
§ 371 (c)(1),
(2), (4) Date: Sep. 9, 2013

(87) PCT Pub. No.: WO2012/101464
PCT Pub. Date: Aug. 2, 2012

(65) Prior Publication Data
US 2014/0016493 A1    Jan. 16, 2014

(51) Int. Cl.
*H04L 12/26* (2006.01)
*H04L 12/875* (2013.01)
*H04L 12/863* (2013.01)

(52) U.S. Cl.
CPC .......... *H04L 43/0864* (2013.01); *H04L 43/106* (2013.01); *H04L 47/56* (2013.01); *H04L 47/624* (2013.01); *H04L 43/0888* (2013.01)

(58) Field of Classification Search
CPC ..... H04L 43/106; H04L 47/624; H04L 47/56; H04L 43/0864
See application file for complete search history.

(56) References Cited

U.S. PATENT DOCUMENTS

| | | |
|---|---|---|
| 2005/0270977 A1 | 12/2005 | King et al. |
| 2008/0298380 A1* | 12/2008 | Rittmeyer et al. ............ 370/412 |
| 2010/0131664 A1* | 5/2010 | Veres ........................... 709/228 |
| 2011/0235630 A1* | 9/2011 | Hui et al. ..................... 370/352 |

FOREIGN PATENT DOCUMENTS

WO    2012/066371 A1    11/2010

OTHER PUBLICATIONS

Hedayat et al, "A Two-Way Active Measurement Protocol (TWAMP)" Oct. 2008, RFC 5357.*
Climento, Phil et al., "Defining Network Capacity," Informational Memo RFC 5136, IETF IPPM, pp. 1-14, Feb. 2008.
International Telecommunication Union, Telecommunication Standardization Sector, "Recommendation ITU-T Y.1540, Internet Protocol Data Communication Service—IP Packet Transfer and Availability Performance Parameters," Mar. 2011.

(Continued)

*Primary Examiner* — Omer S Mian
(74) *Attorney, Agent, or Firm* — Patent Portfolio Builders PLLC (57) ABSTRACT

A method for queuing data packets is described. Upon receipt of a data packet, e.g., at an egress buffer of a node, a position within an output queue at which to place the data packet is determined. The queue position for the data packet can be determined based on various criteria, e.g., the type of the data packet and a time associated with its subsequent transmission, and timing aspects associated with the data packets which are already stored in the queue.

14 Claims, 8 Drawing Sheets

(56) References Cited

OTHER PUBLICATIONS

Svante Ekelin et al., "Real-Time Measurement of End-to-End Available Bandwidth using Kalman Filtering," 10th IEEE/IFIP Network Operations and Management Symposium (NOMS), Vancouver, Canada, Apr. 2006.

International Search Report issued in corresponding International application No. PCT/IB2011/000145, date of mailing Oct. 21, 2011.

* cited by examiner

METHOD FOR QUEUING DATA PACKETS AND NODE

TECHNICAL FIELD

The present invention generally relates to packet-switched networks and associated methods and, more particularly, to techniques for handling buffers in conjunction with measuring available capacity and/or tight link capacity of paths in such networks.

BACKGROUND

During the past years, the interest in using mobile and landline/wireline computing devices in day-to-day communications has increased. Desktop computers, workstations, and other wireline computers currently allow users to communicate, for example, via e-mail, video conferencing, and instant messaging (IM). Mobile devices, for example, mobile telephones, handheld computers, personal digital assistants (PDAs), etc. also allow the users to communicate via e-mail, video conferencing, IM, etc. Mobile telephones have conventionally served as voice communication devices, but through technological advancements they have recently proved to be effective devices for communicating data, graphics, etc. Wireless and landline technologies continue to merge into a more unified communication system, as user demand for seamless communications across different platforms increases.

To accommodate the new and different ways in which networks are being used to provide various services, new active measurement techniques are being developed and standardized to verify the service performance. Knowing how much capacity is available in real-time on a path (congested or not) across one or more IP, Ethernet or MPLS networks is valuable information to the network operators or application users. Measurements of available path capacity can be used for network characterization and application performance estimation. For instance, the available path capacity metric can be used for network monitoring, troubleshooting, server or gateway selection, admission control or simply to verify the Service Level Agreement (SLA) of a guaranteed or business class service offering across a network provider.

Active probe based sampling of network paths (or path segments) has been established as a viable methodology for making inferences on the state of the available IP-layer bandwidth capacity on such paths (and path segments). IP-layer performance metrics such as the available path capacity and tight link capacity have been defined in many standard bodies including the IETF and ITU-T. The IP-layer available path capacity (APC) is defined as the available IP-layer bandwidth capacity between a source host and destination host for a given packet type known as type-P packet corresponding to a transport protocol, port number, packet size and Diffserv codepoint (DSCP). The IP-layer tight link capacity is defined as the IP-layer capacity of the link with the smallest IP-layer available link capacity of a path between a source host and destination host for a given packet type known as type-P packet corresponding to a transport protocol, port number, packet size and Diffserv codepoint (DSCP). Note that the IP-layer available link capacity of the IP-layer tight link equals the IP-layer available path capacity. Also note that metrics similar to the IP-layer capacity are being defined for other network technologies as well.

The IETF IP Performance Metrics (IPPM) working group have defined two IP active measurement protocols: One-Way Active Measurement Protocol (OWAMP) and Two-Way Active Measurement Protocol (TWAMP). OWAMP is designed for measuring one-way packet delay and one-way packet loss between two hosts. TWAMP is based on OWAMP and is designed for measuring one-way and two-way (round-trip) packet delay and packet loss between two hosts.

The TWAMP protocols include two protocols: the TWAMP control protocol and the TWAMP test protocol. The TWAMP control protocol is used to initiate, start and stop TWAMP test sessions. The TWAMP test protocol is used to exchange TWAMP test packets between two TWAMP hosts or endpoints. Test sessions can also be configured without the TWAMP control protocol and this is known as TWAMP light.

The TWAMP measurement architecture is usually comprised of only two hosts with specific roles. This is known as the two-host implementation. One host plays the role of the control-client and session-sender and the other host plays the role of the server and the session-reflector. The host that initiates the TWAMP control TCP connection takes the roles of the control-client and session-sender. The host that acknowledges the TWAMP control TCP connection accepts the roles of the server and session-reflector. In real-life network deployment, each host may participate in several active sessions at the same time, both as control-client/session-sender and server/session-reflector.

In a TWAMP test session, packets are time stamped, tagged with sequence numbers and transmitted from a session-sender to a session-reflector. The session-reflector time stamps the incoming packets, create new test packets (one packet is created for each test packet received by the session-reflector) and send them to the session-sender as soon as possible. Using these time stamps and sequence numbers, the session-sender can then calculate the one-way delay, jitter and packet loss for the session in both the forward path and the reverse path. However, it would be desirable to provide methods, devices, systems and software which are capable of measuring other IP path parameters, such as available path capacity (APC) and tight link capacity.

Most available capacity estimation methods (e.g. BART, PathChirp, Spruce, Pathload) need to send and receive packets in groups, called packet trains or simply trains. Each train is sent at a specific transmission rate in a single, given direction. These trains must be identified within each bi-directional test session stream.

The TWAMP standard states that each packet to be reflected should be transmitted as soon as possible from the session-reflector. Introducing the capability of measuring APC using TWAMP will cause additional delay for non-APC packet reflection on the session-reflector. Accordingly, it would be desirable to provide buffer handling mechanisms in IP nodes which take into account APC measurements.

SUMMARY

A method for queuing data packets is described. Upon receipt of a data packet, e.g., at an egress buffer of a node, a position within an output queue at which to place the data packet is determined. The queue position for the data packet can be determined based on various criteria, e.g., the type of the data packet and a time associated with its subsequent transmission, and timing aspects associated with the data packets which are already stored in the queue.

According to one embodiment, a method for queuing data packets includes the steps of receiving at least one data packet, determining a position within a queue to place the at least one data packet between two data packets which are already in the queue, wherein the position is based, at least in part, upon a delay between a transmission of the two packets, and placing the received at least one data packet into the queue at the position.

According to another embodiment, a node which receives and queues data packets includes an output queue configured to store the data packets for subsequent transmission, and a queue jumping module configured to evaluate at least one received data packet and to place the at least one received data packet at either an end of the output queue or between two data packets which are already stored in the output queue based, at least in part, upon a delay between a transmission of the two packets.

According to another exemplary embodiment, an IP node is configured to receive and forward normal IP packets and available path capacity (APC) IP test packets, the IP endpoint node including an output queue configured to store the normal. IP packets and the APC IP test packets for subsequent transmission, wherein each of the APC IP test packets is stored with a corresponding delay value which indicates a delay between transmission of consecutive APC IP test packets in a test packet train, and a queue jumping module configured to evaluate at least one received IP packet and to place the at least one received IP packet at either an end of the output queue or between two IP packets which are already stored in the output queue based, at least in part, upon the corresponding delay associated with the two IP packets.

The following exemplary embodiments provide advantages and benefits relative to buffering data packets. For example, embodiments decrease the time between receiving a packet, e.g., at a TWAMP enabled node, and transmitting that packet back to the Session-Sender. Additionally, embodiments can remedy the problem of denial-of-service attacks towards, e.g., TWAMP nodes operating in APC mode. Moreover, embodiments can increase the throughput with respect to packet reflection at, e.g., a TWAMP session-reflector.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

As mentioned above, the TWAMP standard states that each packet to be reflected should be transmitted as soon as possible from the session-reflector. Introducing the capability of measuring APC using TWAMP will cause additional delay for non-APC packet reflection on the session-reflector. This is due to probe-packet train buffering and output queue handling which is required for accurate APC estimation. This delay can become very large and hence may violate the original TWAMP standard which specifies that each test packet should be reflected as soon as possible. An exemplary implementation of APC in TWAMP is described, among other things, in International Patent Application PCT/IB2010/002949, filed on Nov. 18, 2010, the disclosure of which is incorporated here by reference.

Moreover, an APC enabled TWAMP host is also vulnerable to denial-of-service attacks. If the session-reflector is reflecting a very long train with a long and fixed inter-packet separation time (up to 1 second) any new packets received by the reflector have to wait until that train is sent.

In TWAMP APC mode the test packets are carefully separated with a given time interval at the session-sender/session-reflector in order to send the test packets to the session-reflector/session-sender at a predefined rate. This means that there are delays introduced in the output queue. Embodiments described herein introduce, for example, a queue jumping technique for TWAMP reflectors that leverages on the fact that the output queue is not served at line speed when operating in APC mode. Test packets are, for example, put into places in the output queue where the output queue is currently idle.

Figure 1:
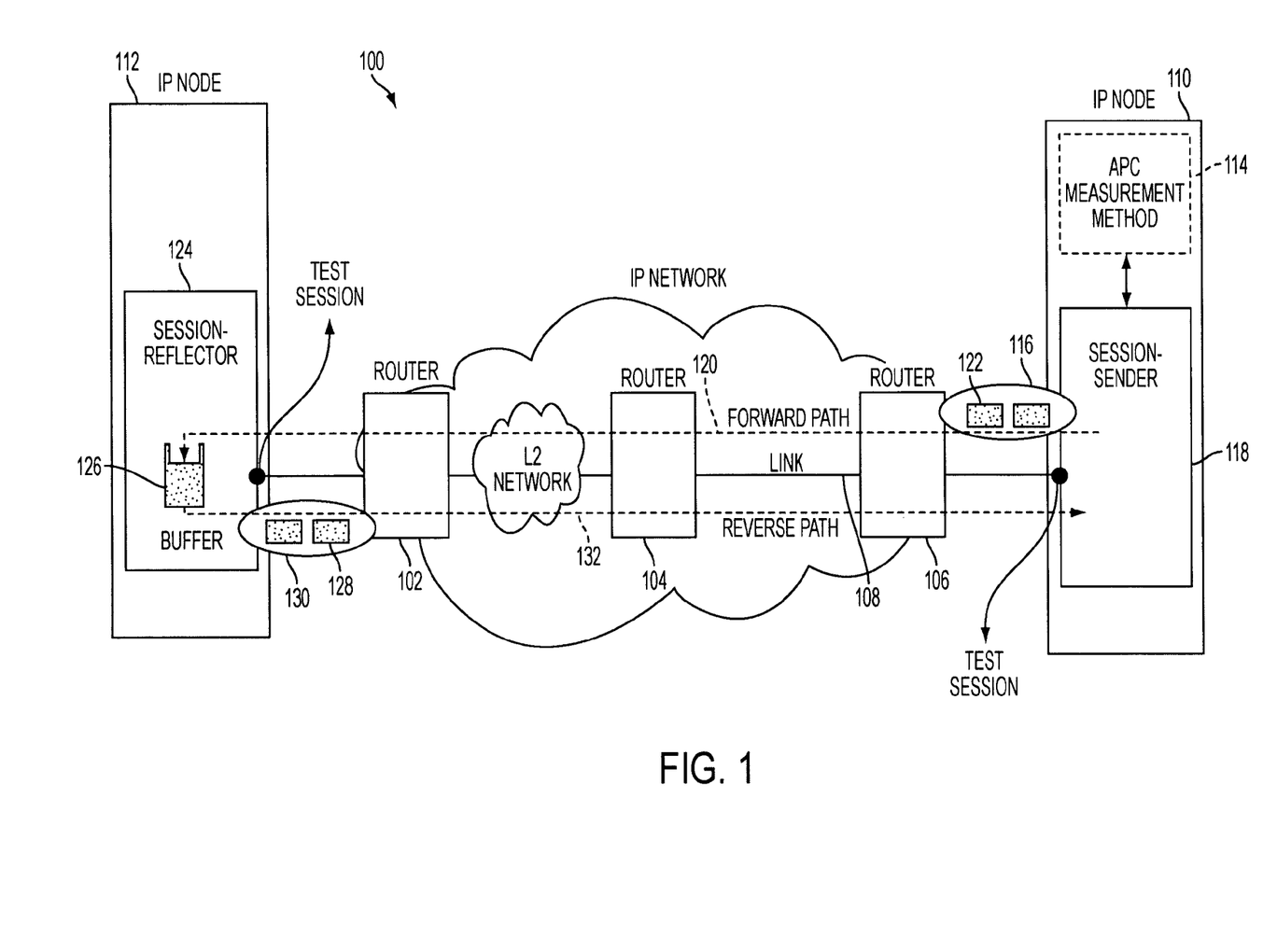
FIG. 1 is a diagram of a portion of an exemplary IP network in which both normal data packets and available path capacity (APC) test packets can be transmitted and received in accordance with embodiments.

To provide some context for the discussion of buffer handling according to these embodiments, FIG. 1 illustrates an exemplary IP network 100 in which available path capacity and tight link capacity can be measured. Therein, the IP network (e.g., an IPv4 or IPv6 network) 100 includes, for example, a number of routers 102, 104 and 106 which are connected to one another by wireline or wireless connections (IP hops) to collectively form a forward path 120 and a reverse path 132 between two endpoint IP nodes 110 and 112. A link 108 in the forward path 120 or reverse path 132 can include one or more of an Ethernet wire, an Ethernet connection over a Metro Ethernet network, a wireless connection or any other link-layer media.

According to this embodiment, endpoint node 110 can, for example, be an IP/UDP node running an active measurement protocol with an available path capacity measurement method or application 114 which is capable of measuring the available bandwidth capacity and/or tight link capacity of the forward path 120 and reverse path 132 in a non-intrusive manner. Specific details of this protocol and corresponding measurement activities are described in more detail below. The IP nodes 110, 112 can be, for example, a host, router, test equipment or any other platform running an IP stack.

To perform an available IP path capacity test or tight IP link capacity test according to exemplary embodiments, a forward packet train 116 is generated by a Session Sender function 118 running on node 110, and transmitted in a forward path direction 120. FIG. 1 illustrates a single forward packet train 116 including two Session Sender IP test packets 122, however it will be appreciated by those skilled in the art that more than two IP test packets can be included in a forward packet train according to exemplary embodiments.

The forward packet train 116 is received by the other endpoint 112's Session Reflector function 124. The Session Reflector function 124 buffers the test IP packets which it receives in buffer 126, and then uses those buffered packets to generate corresponding Session Reflector test IP packets 128. Here buffer 126 is used generically, but can include both an ingress (receive) and egress (output buffer) as will be described below. The Session Reflector test IP packets 128 are transmitted back toward node 110 as part of a reverse packet train 130 transmitted in the reverse path direction denoted by dotted line 132. Again, as noted above, reverse packet train 130 can include more than two IP test packets. Of particular interest for this discussion, it should be noted that the test packets which are transmitted in the reverse path direction 132 are transmitted with predetermined delays between each test packet as will be discussed in more detail below.

Exit timestamps are provided in the IP test packets 122 and IP test packets 128 to indicate their time of transmission by the Session Sender function 118 and Session Reflector function 124, respectively. Similarly, arrival timestamps are inserted into (or otherwise associated with) the IP test packets 128 to indicate the time at which the corresponding IP test packets 122 in the forward packet train 116 arrived at the endpoint node 112, and into the IP test packets 128 to indicate the time at which the packets 128 arrive back at the endpoint node 110.

Using this information, various IP path capacity metrics, e.g., the available path capacity and tight link capacity, in the forward path direction 120 can be calculated by the APC measurement function 114 from the exit timestamps inserted in the test packets 122 by the Session-Sender function 118 and the arrival timestamps inserted or associated with the test packets 128 at the Session-Reflector function 124. Similarly, the available path capacity and tight link Capacity in the reverse path direction 132 can be calculated by the APC measurement function 114 from the exit timestamps inserted in the reflected test packets 128 by the Session-Reflector and the arrival timestamps inserted or associated with the reflected test packets at the Session-Sender 118. Examples of IP path capacities which can be measured or determined in accordance with exemplary embodiments specifically include, but are not limited to, available path capacity (APC) and tight ink capacity (TLC), which are defined in the standards specifications documents ITU Y.1450 Amendment 1, March 2009 and IETF RFC 5136, the disclosures of which are incorporated here by reference. The specific algorithm(s) used by APC measurement function 114 to calculate specific IP path capacity parameters are beyond the scope of this discussion, since any desired technique can be employed. However a purely exemplary algorithm is described in the article entitled "Real-Time Measurement of End-to-End Bandwidth using Kalman Filtering", to Svante Ekelin et al., Network Operations and Management Symposium (NOMS), April 2006, 10$^{th}$ IEEE/IFIP, pp. 73-84, the disclosure of which is incorporated herein by reference.

It will be appreciated by those skilled in the art that the above-described, exemplary portion of an IP network 100, is purely illustrative and that other IP node configurations, IP link configurations, etc., can be used in conjunction with buffer handling techniques according to embodiments which are described in more detail below. For example, the IP node 110 which controls the Session-Sender function 118, as well as the IP node 112 which controls the Session-Reflector function 124, can support multiple concurrent test sessions with different IP packet characteristics (e.g. DiffServ codepoint and packet size). Moreover, the APC measurement function 114 can run on the same IP endpoint node 110 as the Session-Sender function 118 or can run on a separate node or server.

In addition to APC test packets, the IP nodes 110 and 112 will also transmit and receive data packets associated with normal TWAMP traffic. In this context, the term "normal" refers to any TWAMP traffic which is not sent as part of an APC test session. Different sessions, both normal TWAMP and APC test, can be managed by a test session manager (not shown). Each received packet is time stamped by the time stamp generator and thereafter put in an ingress packet buffer. The test session manager reads the ingress packet buffer and creates a per-session control block for each session. If the packet received is a normal packet, i.e. not an APC test packet, the packet is put in the egress packet buffer after the per-session control block statistics have been updated. If the packet belongs to an APC session, the packet is buffered in its corresponding per-session control block until the whole train is received, thereafter is can be reflected to the session-sender. At that time, all packets in that train are put in the egress packet buffer.

Normal packets are typically transmitted as quickly as possible, i.e., no intentional delay is introduced between the transmission of normal packets in a session which are stored in an output packet buffer. By way of contrast, APC testing involves the insertion of delays between APC test packets which are being reflected by session-reflector 124. In order to determine the inter-packet separation between two consecutive APC test packets, the output queue does not only hold the packet data itself, but also a delay attribute referred to herein as delta. Delta thus determines the waiting time between the transmission of two consecutive packets which are stored in an output queue.

Figure 2A:
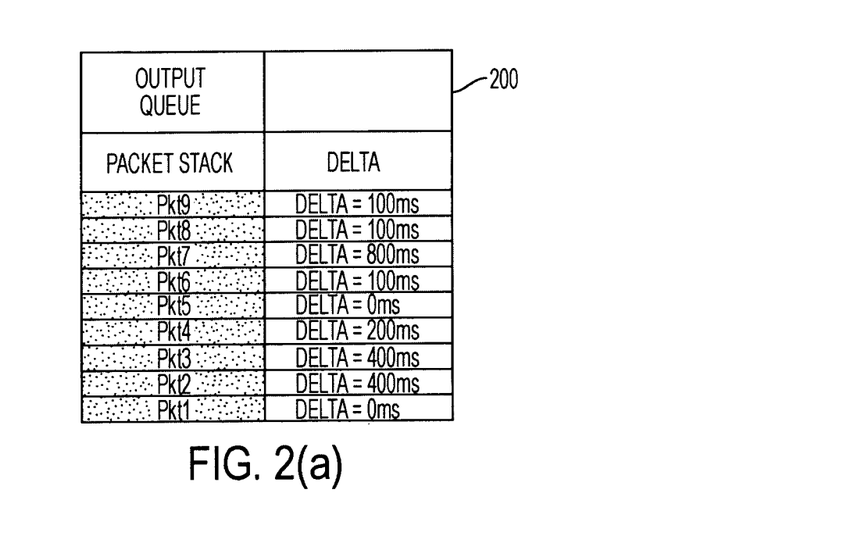
FIG. 2(a) illustrates an output queue containing data packets and corresponding delta values according to an embodiment.

This aspect of the embodiments is illustrated in the output queue 200 of FIG. 2(a). Therein, for example, packet 2 has delta=400 ms which means that the packet 2 should wait 400 ms before being sent to the packet transmitter (or being transmitted by the packet transmitter) after packet 1 has begun its transmission, e.g., by starting a time counter when the first bit of packet 1 is transmitted. Note that both the delta values shown in FIG. 2(a) and this particular way to calculate the delay are purely illustrative.

Figure 2B:
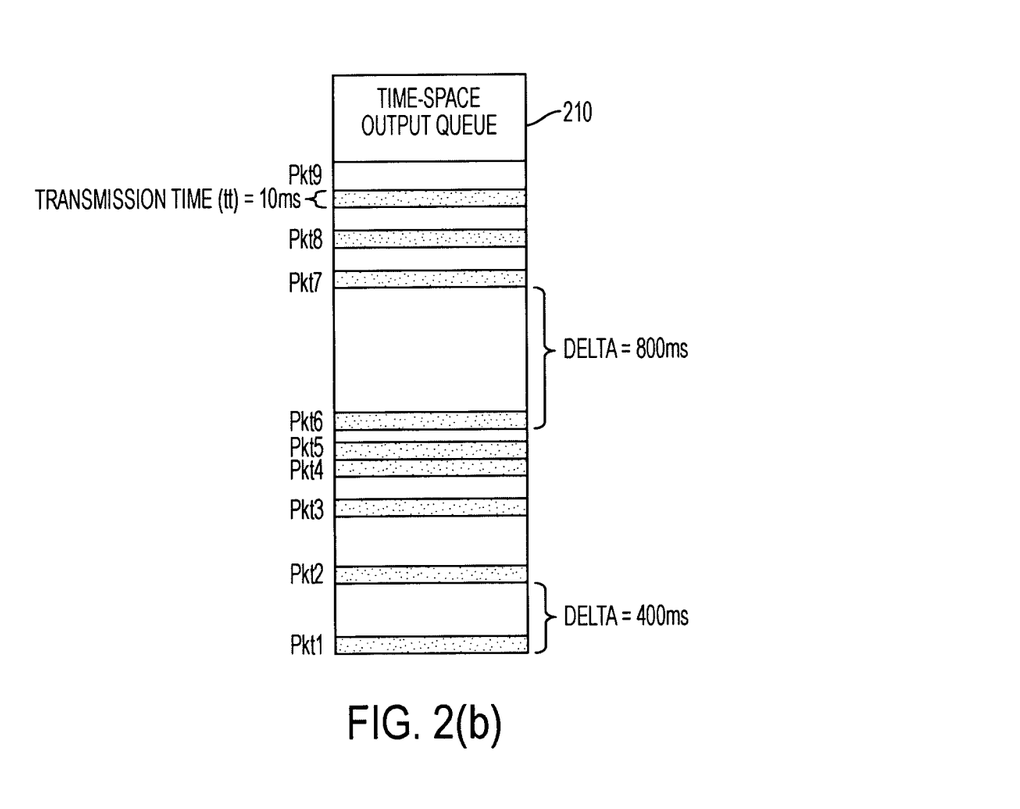
FIG. 2(b) the output queue of FIG. 2(a) using a time-space representation.

To further illustrate how these delays affect the packet transmission in a node, the output queue 200 shown in FIG. 2(a) is also represented as a time-space output queue 210 in FIG. 2(b). Therein, the same nine packets are stored in the queue 210 as in the queue 200. However the delta values are not illustrated numerically. Instead, in the representation of FIG. 2(b), both the positions of the packets in the queue 210 and the delays or deltas between the packets are visible as rectangles in the queue 210, wherein the size of the gaps between the packets in the buffer represents the time delay between their respective transmission. However, those skilled in the art will appreciate that this representation is purely conceptual as, in practice, packets will not be stored in a manner in which they are physically spaced apart by a distance which is a function of their relative time delays. The transmission time tt of each packet is also shown in FIG. 2(b) as the width of each packet, and is determined by, for example, the packet size and the network interface card (NIC) speed. Observe that delta will be larger than the transmission time in order to give rise to an increased inter-packet separation (i.e. not sending packets back-to-back). If delta<tt the packets are transmitted back-to-back. As described above, each packet in the output queue 200 or 210 is associated with a delta value determining the inter-packet separation. That is, the delta value associated with a buffered packet determines how long the packet transmitter should wait between sending two consecutive packets. Delta is typically zero in normal mode and nonzero in APC mode. Thus, for example, packet 5 in FIGS. 2(a) and 2(b) is a normal packet, whereas the remaining packets are APC test packets. However the provision of such delays within the APC test packet trains results in time periods when the packet transmitter is not transmitting, thereby increasing the latency of normal packets being routed through the IP node.

These embodiments provide, among other things, a queue jumping mechanism which enables normal packets to be selectively transmitted within delays between test packets. An example is provided as FIG. 3. Therein, the egress packet buffer 300 includes an output queue 210 (using the time-space representation from FIG. 2(b)), and a queue jumper 310. Note that for consistency of the examples, the same nine data packets with their corresponding deltas from FIGS. 2(a) and 2(b) are used in the embodiment of FIG. 3.

Figure 3:
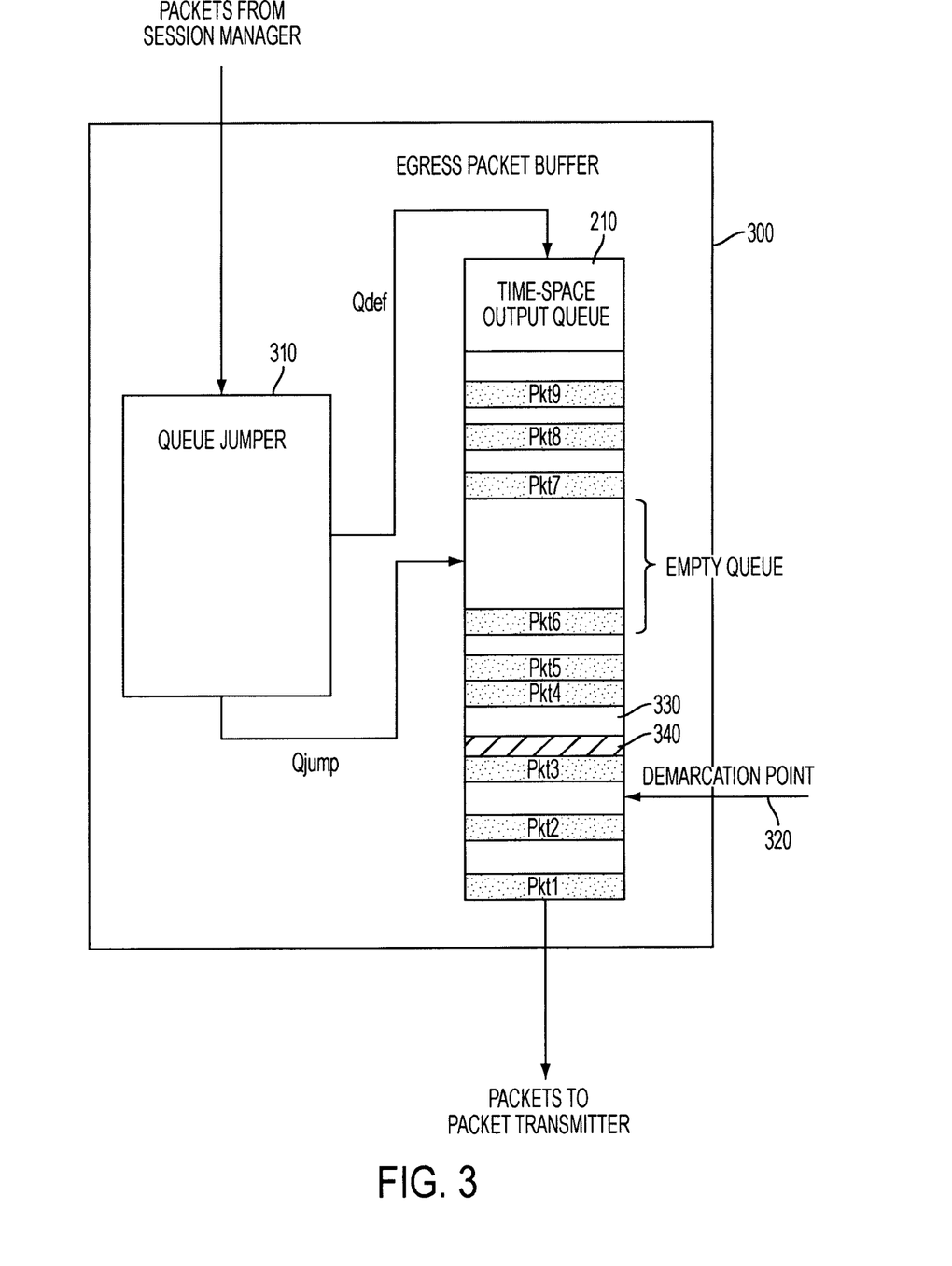
FIG. 3 depicts an egress buffer according to an embodiment.

The queue jumper function 310 receives data packets from a session manager, e.g., via an interface with an ingress buffer (not shown) and evaluates those data packets for placement in the output queue 310. The packets will progress through the queue 210 until they are output via another interface to a packet transmitter.

Data packets received by the queue jumper 310 can, for example, either be placed at the end of the queue (i.e., as indicated by the line Qdef) or they can be selectively inserted into the "spaces" in the queue which are created by the delays associated with one or more of the data packets which are already in the queue 210 and which are awaiting transmission. An example is shown in FIG. 3 by the line Qjump which points to an empty portion of the output queue which is created by the 800 ms delay which has been predetermined between the transmission of packets 6 and 7 in the queue 210. It will be appreciated, however, that the queue jumper can, however, potentially place received data packets in any of the gaps associated with delays between APC test packets, as will be described in more detail below, and that the Qdef pointer in FIG. 3 is purely illustrative.

Figure 4:
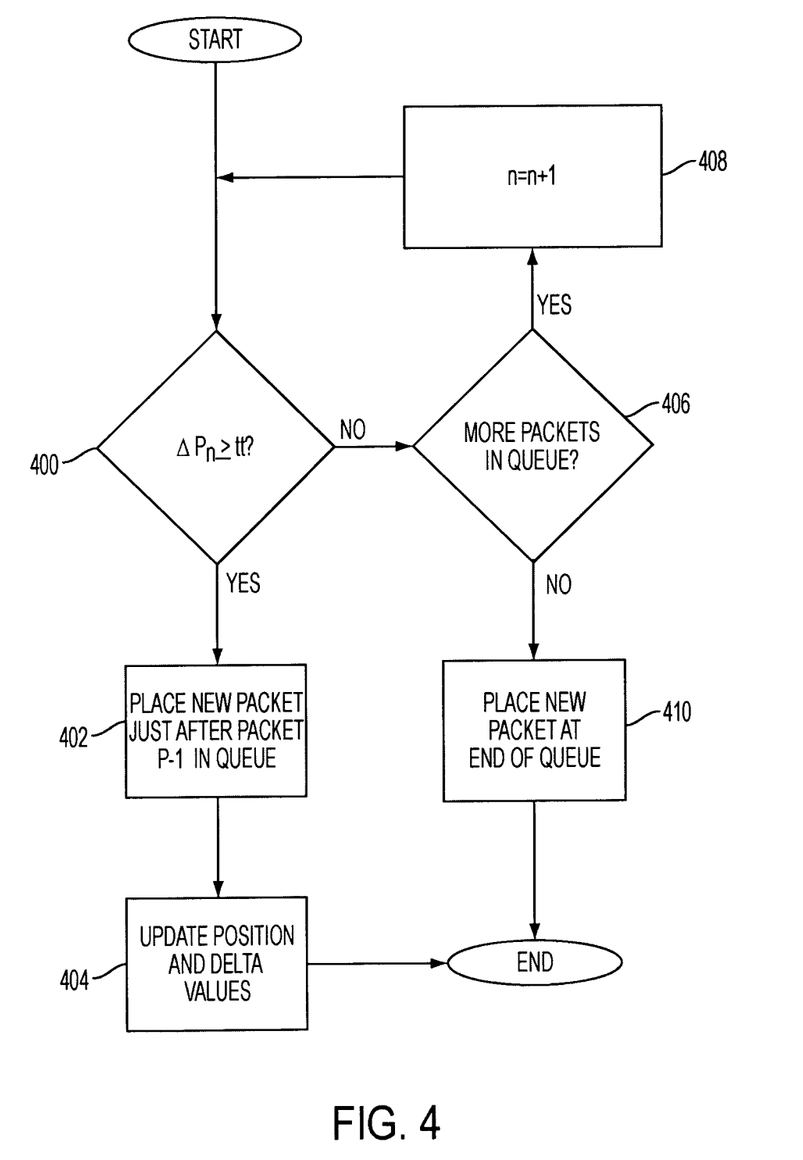
FIG. 4 is a flow chart illustrating placement of a normal data packet into an output queue according to an embodiment.

According to an embodiment, the evaluation of received packets by the queue jumper can be performed based, at least in part, on whether the received packet is a normal packet (e.g., associated with user traffic) or is a test packet associated with an APC test packet train. FIG. 4 depicts a method for evaluating a normal packet that is received by the queue jumper 310 according to an embodiment. Therein, at step 400, the queue jumper 310 evaluates the delta value which is stored in the queue 210 for a first data packet Pn, i.e., ΔPn, to determine whether that delay value is larger than or equal to the transmission time ft of the normal packet which the queue jumper 310 has received from the session manager. While Pn could theoretically be the frontmost packet in the queue 210, e.g., packet 1 in FIG. 3, in practice it may be desirable to start the evaluation process at some point further back in the queue so that packet transmission itself is not interrupted or interfered with. Thus, according to the embodiment of FIG. 3, a suitable demarcation point 320 is selected that is far enough back in the queue 210 to avoid impacting packet transmission.

Thus, in the purely illustrative embodiment of FIG. 3, the initial ΔPn which is evaluated is that associated with packet 4, i.e., the delay between the transmission of packet 4 after packet 3. If that delay, represented by the gap 330 in the time-space representation of the output queue 210, is larger than the transmission time of the new normal packet, then the flow proceeds along the "Yes" path from decision block 400 to step 402. There, the queue jumper 310 places the new normal packet 340 into the queue 210 just after the packet P-1. Then, the queue jumper 310 can update various stored parameters to reflect the insertion of the new normal packet 340 into the queue at the "jumped" position, e.g., by updating the delta value of packet P to be equal to its previously stored delta value minus the transmission time tt of the new normal packet 340, setting the delta value of the new normal packet 340 to zero, and updating a list of packet delta values and positions within the queue 210 which is maintained by the queue jumper 310, as shown in step 404. Thus, these steps have the effect of moving the newly received, normal data packet further up in the queue 210 than simply placing it at the back of the queue and use what would otherwise be "dead" time for the packet transmitter, i.e., during the intentional delays between APC test packets, to reduce the latency of for this (and other) data packets.

If, alternatively, the delay between packets 3 and 4 in this example, i.e., the initial ΔPn, is less than the transmission time tt of the newly received normal packet, then the flow moves along the "No" path from decision block 400 to step 406. Therein, if more packets are in the output queue 210, the packet index n is incremented (at step 408) and the delay between the next pair of data packets (moving toward the back of the queue, e.g., between packet 4 and packet 5 in this example) is evaluated at step 400 to see if it is large enough to accommodate the new normal packet. This process can continue until a position is found in the queue 210 or all of the delays have been evaluated without finding a delay that is long enough to accommodate the new normal packet. In the latter case the flow follows the "No" branch from decision block 406 to reach step 410 wherein the new normal packet is then inserted at the back of the queue 210, i.e., when no queue jumping is possible for this particular data packet.

Figure 5:
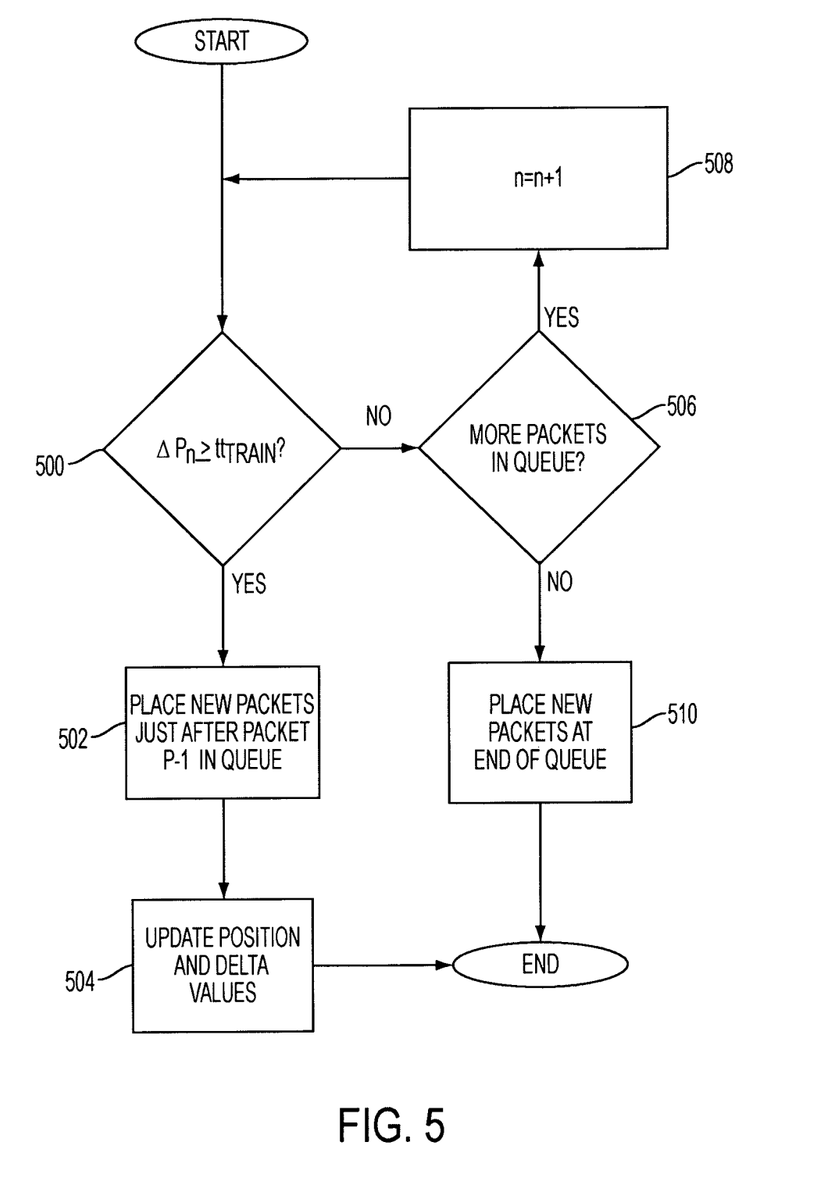
FIG. 5 is a flow chart illustrating placement of a train of test packets into an output queue according to an embodiment.

A similar process can be used to handle APC test packets, i.e., data packets which are sent in a train to test available path capacity in a link, which are received by the egress packet buffer 300 as shown in FIG. 5, except that instead of evaluating individual data packets for insertion into the queue 210, the queue jumper 310 in this case evaluates an entire APC test packet train for insertion into the queue 210 in order to preserve the predetermined transmission spacing between test packets in the train. Therein, at step 500, the initial delta value ΔPn associated with two data packets already stored in the queue 210 is again evaluated by the queue jumper but this time it is compared to the transmission time of the entire train of APC test packets $tt_{train}$. That is ΔPn is compared with the sum of the deltas associated with each test packet in the received train of test packets at step 500.

If the entire train can be transmitted during the delay between these two data packets, then the flow proceeds along the "Yes" path to block 502, where the entire APC test packet train is inserted into the queue 210 at a position just after packet P-1. Then, the queue jumper 310 can update various stored parameters to reflect the insertion of the new test packets into the queue at the "jumped" position, e.g., by updating the delta value of packet P to be equal to its previously stored delta value minus the total transmission time associated with the test packet train, i.e., the total of the transmission time of each test packet plus each delay between each of the test packets, setting the delta value of the first packet in the test train to zero, and updating a list of packet delta values and positions within the queue 210 which is maintained by the queue jumper 310, as shown in step 504.

If, alternatively, the delay being evaluated by the queue jumper 310 at step 500, i.e., the initial ΔPn, is less than the total time needed to transmit the received APC test packet train, including its associated delay interval between packets, then the flow moves along the "No" path from decision block 500 to step 506. Therein, if more packets are in the output queue 210, the packet index n is incremented (at step 508) and the delay between the next pair of data packets (moving toward the back of the queue) is evaluated at step 500 to see if it is large enough to accommodate the APC test packet train. This process can continue until a position is found in the queue 210 or all of the delays have been evaluated without finding a delay that is long enough to accommodate the APC test packet train. In the latter case the flow follows the "No" branch from decision block 506 to reach step 510 wherein the new packets associated with the APC test packet train are then inserted at the back of the queue 210, i.e., when no queue jumping is possible for this particular APC test packet train.

Figure 6:
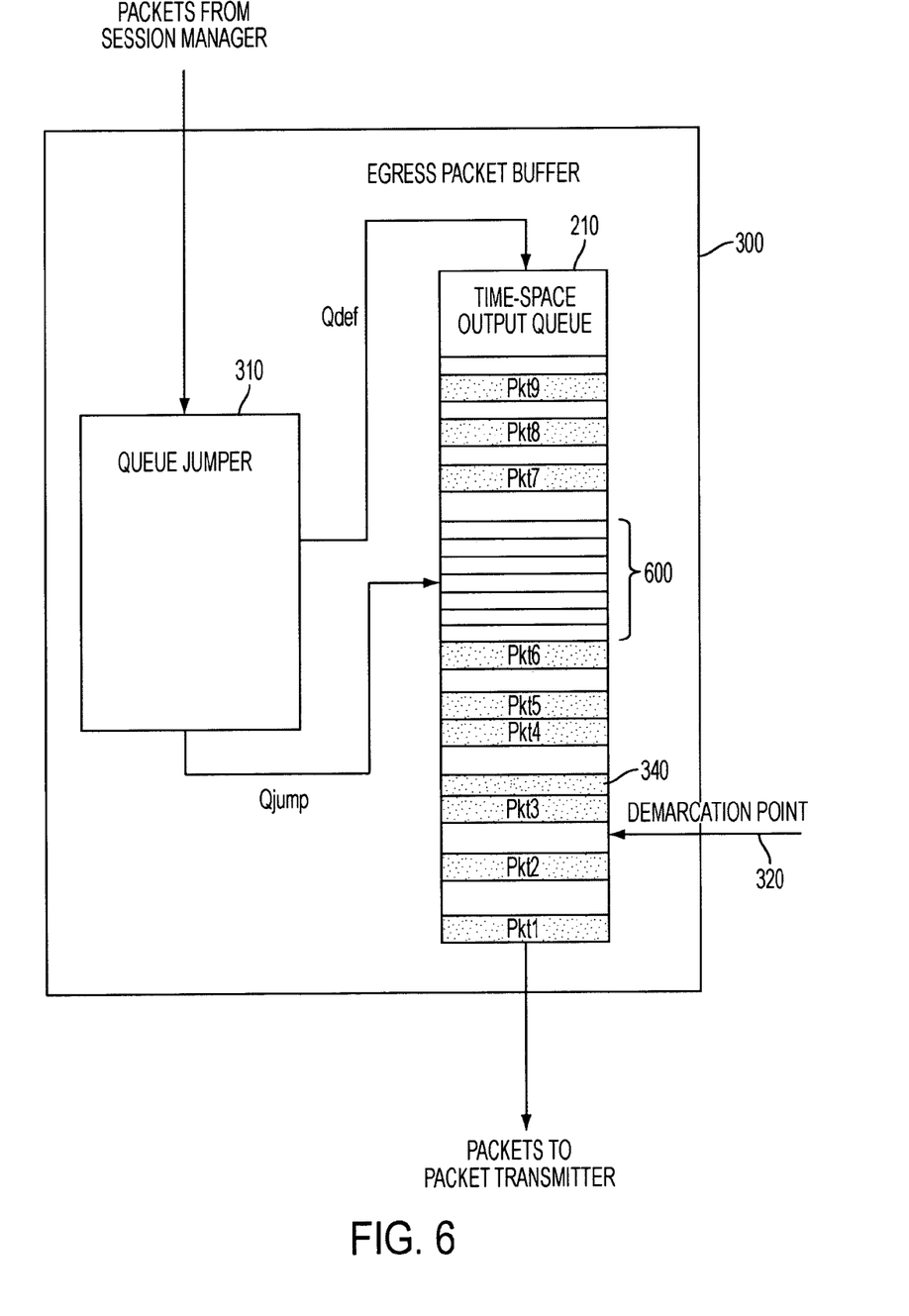
FIG. 6 depicts an egress buffer according to another embodiment.

An example wherein both a normal packet 340 and an APC test packet train are inserted into the output queue 210 is illustrated in FIG. 6, using the same reference numbers as used above for similar elements in FIG. 3. Additionally, the same data packets 1-9 as in FIGS. 2(a) and 2(b) are assumed to be the packets in the time-space output queue 210 at a given moment in time. First, the new normal mode packet 340 is received and processed in accordance with the embodiment of FIG. 4. Since its transmission time is less than the delta between packets 3 and 4, packet 340 is placed just after packet 3. The delta of the new packet is set to zero and the delta of packet 4 is set to the previous delta of packet 4 minus the transmission time of the new packet.

When a packet train operating in APC mode is received, the system of FIG. 6 can operate, for example, as illustrated in FIG. 5. Assume that the total transmission time of the test packet train, including the inter-packet separations between the packets in the train, is less than the delta between packets 6 and 7, but is greater than any other delta closer to the front of the output queue 210, e.g., after the demarcation point 320. Then the entire new test packet train is placed just after packet 6 as shown by reference numeral 600. The delta of packet 6 is set to 0 while the delta of the last packet in the train is set to the delta of packet 7 minus the sum of deltas corresponding to the packets of the train.

Figure 7:
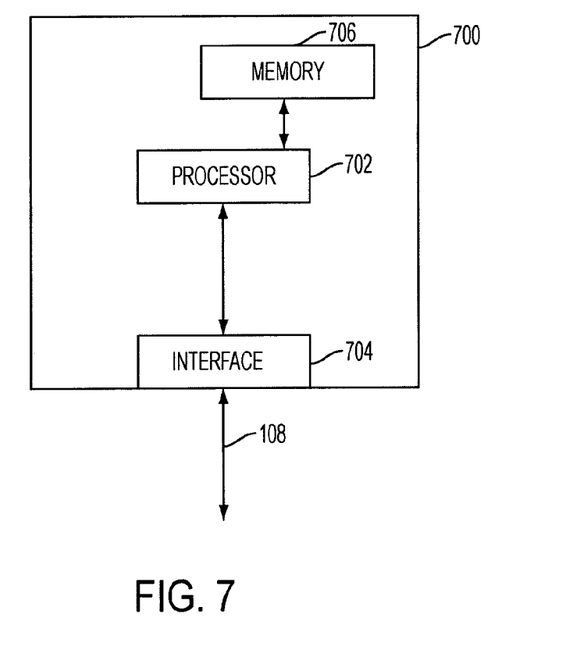
FIG. 7 depicts an exemplary node according to an exemplary embodiment.

IP endpoint nodes 110 and 112, or other nodes which are used to send and receive data packets and use the afore-described techniques for output queue management may, for example, include the elements shown in the node 700 in FIG. 7. For example, a node 700 will generally include a processor 702 which is capable of running software, e.g., application software capable of instantiating instances of the Session-Sender 118 and/or Session-Reflector 124 functions described above. Processor 702 is also capable of generating, transmitting and/or receiving the various normal and test packets potentially via an interface 704 to IP link 108, which interface can represent the desired protocol stack (e.g., IP/UDP, etc.) and may include hardware and/or software. The node 700 can include one or more memory devices, represented by memory device 706, which can be used, e.g., to buffer normal and test packets using the techniques described above.

Figure 8:
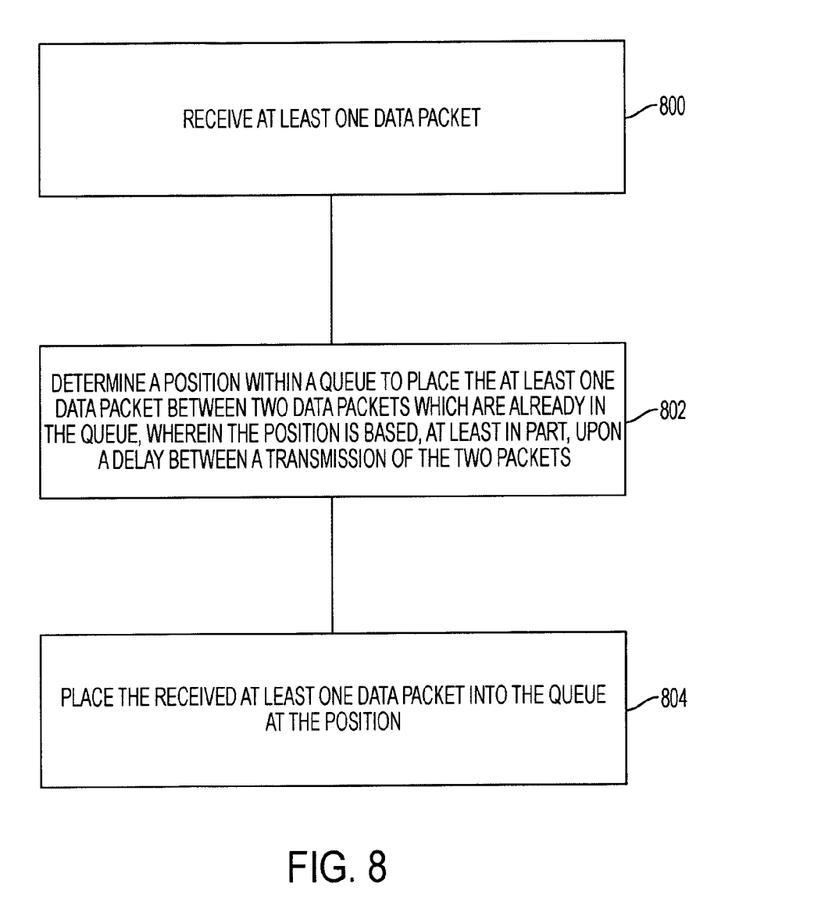
FIG. 8 is a flow chart illustrating a method of placing data packets into an output queue according to an embodiment.

Using the afore-described techniques and structures, an exemplary method for queuing data packets according to an embodiment can include the steps illustrated in the flow chart of FIG. 8. Therein, at step 800, at least one data packet is received. The data packet can, for example, be a normal packet or a train of test packets. At step 802, a position within a queue to place the at least one data packet between two data packets which are already in the queue is determined, wherein the determined position is based, at least in part, upon a delay between a transmission of the two packets. The received at least one data packet is then placed into the queue at the position as indicated by step 804.

The above-described exemplary embodiments provide advantages and benefits relative to buffering data packets. For example, embodiments decrease the time between receiving a packet, e.g., at a TWAMP enabled node, and transmitting that packet back to the Session-Sender. Additionally, embodiments can remedy the problem of denial-of-service attacks towards, e.g., TWAMP nodes operating in APC mode, since the potentially large and numerous delays which can be specified for a test packet train can be automatically filled using the afore-described techniques. Moreover, embodiments can increase the throughput with respect to packet reflection at, e.g., a TWAMP session-reflector.

Although the features and elements of the embodiments are described in those embodiments in particular combinations, each feature or element can be used alone without the other features and elements of the embodiments or in various combinations with or without other features and elements disclosed herein. The methods or flow charts provided in the present application may be implemented, at least in part, in a computer program, software, or firmware tangibly embodied in a computer-readable storage medium for execution by a general purpose computer or a processor. This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A method for queuing data packets comprising:
   receiving, at an egress buffer, data packets of a train of packets including at least two data packets;
   determining a position within a queue stored in the egress buffer, the queue having a set of queued data packets having a total transmission time;
   storing, in a list, a first delay as a transmission delay between a first two queued data packets and a second delay as a transmission delay between a second two queued data packets, wherein at least one of the second two queued data packets being subsequent to the first two queued data packets in time; and
   placing said train of packets into said queue at the determined position,
   wherein determining the position and placing comprise:
      determining whether the first delay is larger than or equal to the total transmission time of the train of packets,
      wherein when the first delay is larger than or equal to the total transmission time of the train of packets, the determined position is between the first two queued data packets of the set of queued data packets and the first delay in the list is updated by being reduced by the total transmission time of the train of packets,
      wherein when the first delay is less than the total transmission time of the train of packets, it is determined whether the second delay is larger than or equal to the total transmission time of the train of packets, wherein when the second delay is larger than or equal to the total transmission time of the train of packets, the determined position is between the second two queued data packets of the set of data packets and the second delay in the list is updated by being reduced by the total transmission time of the train of packets, wherein when the total transmission time of the train of packets is larger than a delay between any two of the queued data packets, the determined position is at an end of the queue.

2. The method of claim 1, wherein said train of packets comprise (available path capacity), APC, test packets associated with an APC test packet train.

3. The method of claim 1, wherein said train of packets comprise Two-Way Active Measurement Protocol, TWAMP test packets.

4. The method of claim 1, wherein said train of packets comprise one of IP packets, Ethernet packets and MPLS packets.

5. A node which receives and queues data packets, said node comprising:
    an egress buffer storing an output queue, which stores a set of queued data packets for subsequent transmission; and
    a processor configured to
        determine a position within the output queue to place a train of packets including at least two data packets, wherein the train of packets is received at the egress buffer and has a total transmission time;
        store, in a list, a first delay as a transmission delay between a first two queued data packets and a second delay as a transmission delay between a second two queued data packets, wherein at least one of the second two queued data packets being subsequent to the first two queued data packets in time; and
        place said train of packets into said queue at the determined position,
        wherein determining the position and placing comprise:
            determining whether the first delay is larger than, or equal to, the total transmission time of the train of packets,
            wherein when the first delay is larger than or equal to the total transmission time of the train of packets, the determined position is between the first two queued data packets of the set of queued data packets and the first delay in the list is updated by being reduced by the total transmission time of the train of packets,
            wherein when the first delay is less than the total transmission time of the train of packets, it is determined whether the second delay is larger than, or equal to, the total transmission time of the train of packets,
            wherein when the second delay is larger than or equal to the total transmission time of the train of packets, the determined position is between the second two queued data packets of the set of data packets and the second delay in the list is updated by being reduced by the total transmission time of the train of packets,
            wherein when the total transmission time of the train of packets is larger than a delay between any two of the queued data packets, the determined position is at an end of the queue.

6. The node of claim 5, wherein said train of packets comprise available path capacity, APC, test packets associated with an APC test packet train.

7. The node of claim 5, wherein said train of packets comprise Two-Way Active Measurement Protocol, TWAMP test packets.

8. The node of claim 5, wherein said train of packets comprise IP packets, Ethernet packets and MPLS packets.

9. An IP node configured to receive and forward normal IP packets and available path capacity, APC, IP test packets, said IP node comprising:
    an egress buffer storing an output queue, which is configured to store a set of queued data packets for transmission, wherein the queued data packets include said normal IP packets and said APC IP test packets, wherein each of said APC IP test packets is stored with a corresponding delay value which indicates a delay between transmission of consecutive APC IP test packets in a test packet train; and
    a processor configured to
        determine a position within the output queue to place at least one train of APC IP test packets received at the egress buffer, wherein the at least one train of received APC IP test packets has a total transmission time;
        store, in a list, a first delay as a transmission delay between a first two queued data packets and a second delay as a transmission delay between a second two queued data packets, wherein at least one of the second two queued data packets being subsequent to the first two queued data packets in time; and
        place said at least one train of received APC IP test packets into said queue at the determined position,
        wherein determining the position and placing comprise:
            determining whether the first delay is larger than, or equal to, the total transmission time of the at least one train of received APC IP test packets,
            wherein when the first delay is larger than or equal to the total transmission time of the at least one train of received APC IP test packets, the determined position is between the first two queued data packets of the set of queued data packets and the first delay in the list is updated by being reduced by the total transmission time of the at least one train of received APC IP test packets,
            wherein when the first delay is less than the total transmission time of the at least one train of received APC IP test packets, it is determined whether the second delay is larger than, or equal to, the total transmission time of the at least one train of received APC IP test packets,
            wherein when the second delay is larger than or equal to the total transmission time of the at least one train of received APC IP test packets, the determined position is between the second two queued data packets of the set of data packets and the second delay in the list is updated by being reduced by the total transmission time of the at least one train of received APC IP test packets,
            wherein when the total transmission time of the train of packets is larger than a delay between any two of the queued data packets, the determined position is at an end of the queue.

10. The IP node of claim 9, wherein processor is further configured to determine the position based on a sum of a transmission time of each of said plurality of APC test packets plus a delay time between each of said plurality of APC test packets in said APC test packet train.

11. The IP node of claim 9, wherein said at least one train of received APC IP test packets is a train of TWAMP IP test packets.

12. The method of claim 1, wherein the first two queued data packets are time-wise before a demarcation point separating packets within the queue that should be assessed for the position determination and packets that should not be assessed for the position determination.

13. The node of claim 5, wherein the first two queued data packets are time-wise before a demarcation point separating packets within the queue that should be assessed for the position determination and packets that should not be assessed for the position determination.

14. The IP node of claim 9, wherein the first two queued data packets are time-wise before a demarcation point separating packets within the queue that should be assessed for the position determination and packets that should not be assessed for the position determination.

\* \* \* \* \*